March 27, 1945.  R. L. VICTOR  2,372,534
CHAIN SAW
Filed June 18, 1943  2 Sheets-Sheet 1
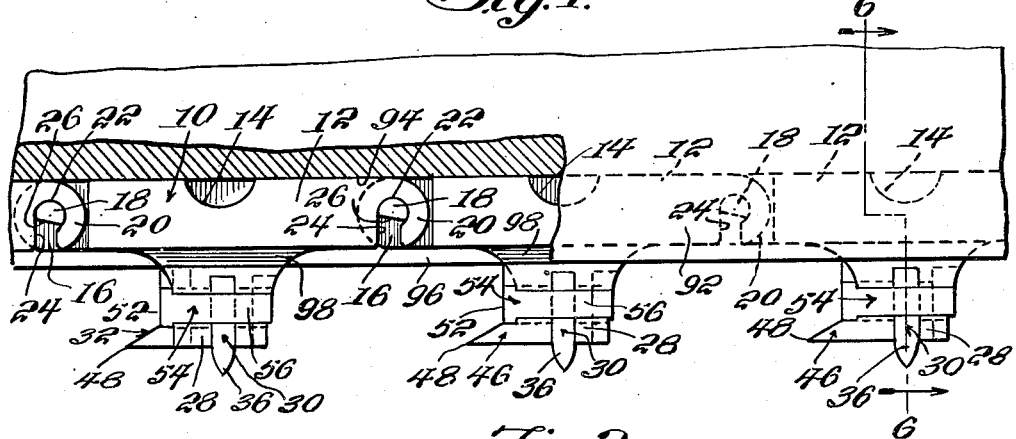
Fig. 1.
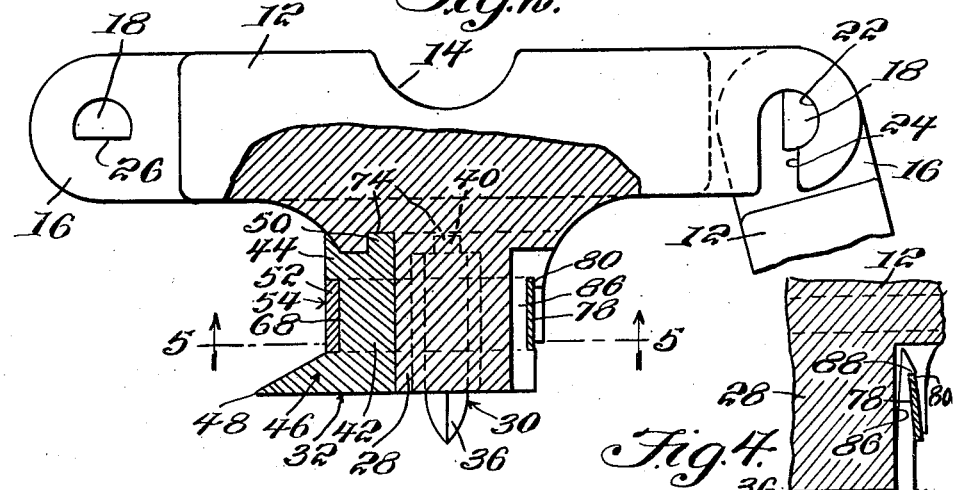
Fig. 2.  Fig. 4.
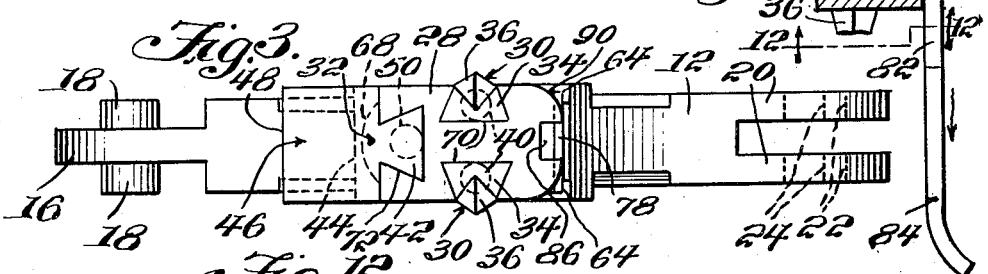
Fig. 3.  Fig. 1½.
INVENTOR.
Robert L. Victor
BY
Victor J. Evans & Co.
ATTORNEYS
WITNESSES:
J. T. L. Wright March 27, 1945.    R. L. VICTOR    2,372,534
CHAIN SAW
Filed June 18, 1943    2 Sheets-Sheet 2

INVENTOR.
Robert L. Victor
BY
Victor J. Evans & Co.
ATTORNEYS

WITNESSES:

Patented Mar. 27, 1945

2,372,534

UNITED STATES PATENT OFFICE 2,372,534

CHAIN SAW

Robert L. Victor, La Grande, Oreg.

Application June 18, 1943, Serial No. 491,360

9 Claims. (Cl. 143—135)

My invention relates to chain saws particularly adapted for felling trees, and has among its objects and advantages the provision of a novel saw equipped with readily detachable teeth.

An object of my invention is to provide a chain saw made up of a plurality of links pivotally connected one with the other, in which the links are provided with detachable teeth to facilitate repair and sharpening thereof, and in which a novel guide is provided for the straight cutting run of the chain to restrain the run from lateral deflection as well as with respect to bending about the axes of the pivotal joints when cutting pressure is applied to the saw.

Another object is to provide a chain saw made up of a plurality of toothed links pivotally connected one with the other, in which a novel guide is provided for the cutting run of the saw in the nature of a rigid channel in which the cutting run slides freely and is restrained from lateral deflection as well as bending about the axes of the link pivots, and in which the saw cuts a kerf of such width as to freely receive the guide.

Another object is to provide a chain saw made up of toothed links pivotally connected one with the other, in which the links are provided with detachable cutting and raker teeth, and in which novel means are provided for firmly keying the teeth to their respective links.

A further object is to provide a saw having a body grooved to removably receive cutting and raker teeth, with said body and teeth provided with common grooves, in which a U-shaped clip is provided for insertion in said common grooves to key the teeth to the body, and in which a novel latch is arranged for coaction with the clip and said body to restrain the clip from accidental displacement.

In the accompanying drawings:

Figure 1 is a side elevational view of a portion of the saw chain, with certain parts broken away for the purpose of illustration;

Figure 2 is an enlarged elevational view of one of the chain links, with a part of the link broken away for the purpose of illustration;

Figure 3 is a bottom plan view of the chain link of Figure 2;

Figure 4 is a sectional detail view illustrating the application of a special tool utilized in unlatching the tooth-retaining clip;

Figure 5 is a sectional view along the line 5—5 of Figure 2;

Figure 6 is a sectional view along the line 6—6 of Figure 1;

Figure 7 is an end elevational view of the tooth assembly;

Figure 8 is an end elevational view of the opposite end of the tooth assembly;

Figure 9 is a perspective view of one of the raker teeth;

Figure 10 is a perspective view of one of the cutting teeth;

Figure 11 is a perspective view of one of the teeth-retaining clips, with portions broken away for the purpose of illustration;

Figure 12 is a view taken from the position indicated by line 12—12 of Figure 4; and Figure 13 is a perspective view of the tool illustrated in Figure 4.

In the embodiment selected for illustration, I make use of a chain 10, which is of the endless type and operates about rollers (not shown), at least one of which constitutes a driver. The chain is made up of links 12, each having a recess 14 for the reception of a sprocket tooth. In Figures 2 and 3 the link 12 includes an ear 16 having coaxial pins 18. Two ears 20 are located at the opposite end of the link and spaced to receive the ear 16 of an adjacent link 12. Each ear 20 is provided with a bore 22 and a slot 24 intersecting the bore, and the pins 18 are slabbed off at 26 so as to slip freely through the slots 24 when the connected links 12 are pivoted in one direction to positions substantially at right angles to each other.

All the links 12 are identical in construction so that the description of one will apply to all. In Figure 2, the link includes a lateral projection or tooth mount 28, which mount carries two cutting teeth 30 and a raker tooth 32. Figure 10 illustrates one of the cutting teeth 30, this tooth having a body 34 of dovetail contour in cross section and a cutting point 36 projecting beyond one end thereof. A transverse T slot 38 is formed in one side face of the body 34, and the opposite end of the body is provided with a key pin 40.

The raker tooth 32 of Figure 9 also includes a body 42 of dovetail contour in cross section. A deflector body 44 is formed on the body 42 and extends transversely thereof, which deflector body is spaced from a blade body 46 having a cutting edge 48. A key pin 50 is formed on the body 42. The blade body 46 is arranged transversely of the body 42 and is spaced therefrom to receive a bight 52 of a U-shaped teeth-retaining clip 54, see Figures 11 and 2.

The clip 54 includes two parallel strap-like legs 56, each of which is grooved at 58 to provide flanges 60. Each leg 56 is provided with a transverse groove 64. The inner face of the bight 52 has a curvature 66 conforming to the curvature 68 on the body 32 between the deflector body 44 and the blade body 46.

Referring to Figures 5, 6 and 7, the tooth mount 28 is provided with two dovetail grooves 70 for the reception of the bodies 34 of the two cutting teeth 30. A dovetail groove 72 is also formed in the mount 28 for the reception of the body 42 of the raker tooth 32. Three bores 74 are provided in the mount 28 for respective reception of the two key pins 40 and the key pin 50. The outer faces of the bodies 34 lie flush with the respective side faces of the mounts 28, and both side faces are provided with T slots 76 for the reception of the legs 56 and the flanges 58. Since the T slots 76 align with the respective T slots 38 in the two bodies 34, the aligned slots provide keyways for the two legs 56.

Figures 6 and 7 respectively illustrate the snug fitting relationship between the legs 56 and the walls of the T slots 38 and 76. Thus the cutting teeth 30 are securely keyed to the mount 28. This snug fit in combination with the length of the two bodies 34 affords good support for the cutting teeth. However, the bodies 34 may be easily removed by merely withdrawing the clip 54 and pulling the teeth out of the grooves 70.

The bight 52 is of such width as to have snug fitting engagement with the bodies 44 and 46 to hold the raker tooth in position. Because of the dovetail contour of the bodies 34 and 42, the cutting and raker teeth are held firmly in position in their respective grooves and forces effective on the respective teeth are transmitted to the mount 28. Thus the clip 54 serves as a key only to restrain the respective teeth from accidental longitudinal displacement. To key the clip 54 against accidental displacement, a spring plate 78 is pressed into the grooves 64, which plate snaps into a recess 80 in the mount 28 so as to firmly latch the clip to the mount.

To remove the spring plate 78, the shank 82 of a tool 84 of Figure 13 is inserted in the slot 86 in the mount 28 and underneath the plate. This shank is provided with a shoulder 88 which engages the inner edge of the plate 78 and bends the plate sufficiently far to clear the walls of the recess 80, thereby permitting withdrawal of the plate. Figure 12 illustrates the mount 28 as being cut away at 90 to provide clearance for the spring plate 78 when the shank 82 is slipped into position.

In Figures 1 and 6, the links 12 are guided between walls 92 of a channel track 94, the links having edge engagement with the bottom wall of the channel. Ribs 96 are formed on the walls 92 and ride in grooves 98 in the links 12 so that the links are held in place in the channel. The channel track 94 has a length at least coextensive with the length of the cutting run of the chain.

Figure 6 illustrates the side faces of the mount 28 as terminating flush with the outer faces of the walls 92, which is also true of the legs 56. This view also illustrates the sidewise deflection or set of the cutting points 36 so as to saw a kerf sufficiently wide to freely accommodate the channel track 94. Thus the links in the straight phase of the cutting run of the chain are held firmly against sidewise deflection as well as against pivotal movement about the axes of the pins 18. This feature provides an effective control for a saw of the link type, both with respect to the cutting action of the teeth and the alignment of the kerf.

Without further elaboration, the foregoing will so fully illustrate my invention, that others may, by applying current knowledge, readily adapt the same for use under various conditions of service.

I claim:

1. In a chain saw made up of pivotally connected links, each link being provided with a plurality of vertical grooves, teeth removably receivable in said grooves, certain of said teeth and said link having longitudinal grooves aligned in the assembly, a recess in the remaining tooth, and a unit key means having a bight receivable in the recess and legs receivable in the aligned grooves to restrain the teeth from relative movement with respect to the link.

2. In a chain saw made up of pivotally connected links, each link having a lateral projection having vertical grooves, teeth removably receivable in said grooves, said projection and said teeth being provided with longitudinal grooves aligned in the assembly, and a U-shaped clip receivable in said aligned longitudinal grooves to restrain the teeth from relative movement with respect to the projection.

3. In a chain saw made up of pivotally connected links, each link having a lateral projection having grooves, teeth removably receivable in said grooves, said projection and said teeth being provided with grooves aligned in the assembly, a U-shaped clip receivable in said aligned grooves to restrain the teeth from relative movement with respect to the projection, said clip having grooves and said projection having a latch groove, and a resilient element receivable in the grooves in said clip and said latch groove to key the clip against relative movement with respect to the projection.

4. In a chain made up of pivotally connected links, each link being provided with a plurality of vertical grooves, cutting teeth and a raker tooth removably receivable in the respective grooves, said cutting teeth and the link provided with longitudinal grooves aligned in the assembly and the raker tooth formed with a recess, and a unit key means received in the aligned grooves of the link and said cutting teeth and the recess of the raker tooth to restrain the teeth from relative movement with respect to the link.

5. In a chain saw made up of pivotally connected links, each link having a lateral projection provided with three grooves, a cutting tooth removably receivable in each of two of said grooves, a raker tooth removably receivable in the third groove, said projection and said cutting teeth being provided with grooves aligned in the assembly and said raker tooth being provided with a recess, and a U-shaped clip having a bight receivable in said recess and legs receivable in said aligned grooves to restrain the cutting and raker teeth from relative movement with respect to the projection.

6. In a chain saw made up of pivotally connected links, each link having a lateral projection provided with three grooves, a cutting tooth removably receivable in each of two of said grooves, a raker tooth removably receivable in the third groove, said projection and said cutting teeth being provided with grooves aligned in the assembly and said raker tooth being provided with a recess, a U-shaped clip having a bight receivable in said recess and legs receivable in said aligned grooves to restrain the cutting and raker teeth from relative movement with respect to the projection, said U-shaped clip being provided with grooves and said projection having a latch groove, and a resilient element receivable in said grooves in the clip and said latch groove to key the clip against relative movement with respect to the projection.

7. In a chain saw made up of pivotally connected links, each link having a lateral projection provided with three grooves of dovetail configuration in cross section, a cutting tooth removably receivable in each of two of said grooves, a raker tooth removably receivable in the third groove, said projection and said cutting teeth being provided with grooves aligned in the assembly and said raker tooth being provided with a recess, a U-shaped clip having a bight receivable in said recess and legs receivable in said aligned grooves to restrain the cutting and raker teeth from relative movement with respect to the projection, said U-shaped clip being provided with grooves and said projection having a latch groove, a resilient element receivable in said grooves in the clip and said latch groove to key the clip against relative movement with respect to the projection, and said cutting teeth and said raker tooth having dovetail formations fitting their respective grooves in the lateral projection of the link.

8. In a chain saw made up of pivotally connected links, each link having a lateral projection provided with three grooves of dovetail configuration in cross section, a cutting tooth removably receivable in each of two of said grooves, a raker tooth removably receivable in the third groove, said projection and said cutting teeth being provided with grooves aligned in the assembly and said raker tooth being provided with a recess, a U-shaped clip having a bight receivable in said recess and legs receivable in said aligned grooves to restrain the cutting and raker teeth from relative movement with respect to the projection, said U-shaped clip being provided with grooves and said projection having a latch groove, a resilient element receivable in said grooves in the clip and said latch groove to key the clip against relative movement with respect to the projection, and said cutting teeth and said raker tooth having dovetail formations fitting their respective grooves in the lateral projection of the link, and a tool-receiving groove in said projection underneath said resilient element.

9. In a chain saw made up of pivotally connected links, each link having a lateral projection provided with three vertical grooves of dovetail configuration in cross section, and a bore leading to each groove, a cutting tooth having dovetailed configuration and a pin and receivable in each of two of said grooves and bores respectively, said cutting teeth being curved outwardly from the sides of the link to form a wide kerf, a raker tooth having a dovetailed portion and a pin receivable respectively in the third groove, said projection and said cutting teeth being provided with grooves aligned in the assembly and said raker tooth being provided with a recess, a U-shaped clip having a bight portion receivable in said recess, and legs receivable in said aligned grooves to restrain the cutting teeth and raker tooth from relative movement with respect to the projection, said U-shaped clip being provided with grooves in the ends of the leg portions, and said projection having a latch groove, a resilient element receivable in said grooves in the legs of the clip and said latch groove to key the clip against relative movement with respect to the projection, and a tool receiving groove in said projection underneath said resilient element.

ROBERT L. VICTOR.